United States Patent

Shimizu et al.

[11] Patent Number: 5,964,364
[45] Date of Patent: Oct. 12, 1999

[54] GLASS PANEL FOR A CATHODE RAY TUBE

[75] Inventors: Naoya Shimizu; Hiroshi Yamasaki, both of Funabashi, Japan

[73] Assignee: Asahi Glass Company Ltd., Tokyo, Japan

[21] Appl. No.: 09/013,205

[22] Filed: Jan. 26, 1998

[30] Foreign Application Priority Data

Feb. 6, 1997 [JP] Japan ................................ 9-024034

[51] Int. Cl.$^6$ .................................................... H01J 29/86
[52] U.S. Cl. .................................... 220/2.1 A; 313/477 R
[58] Field of Search .......................... 220/2.1 R, 2.1 A; 313/477 R

[56] References Cited

U.S. PATENT DOCUMENTS 5,445,285  8/1995  Sugawara et al. .
5,536,995  7/1996  Sugawara et al. .

*Primary Examiner*—Joseph M. Moy
*Attorney, Agent, or Firm*—Oblon, Spivak, McClelland, Maier & Neustadt, P. C.

[57] ABSTRACT

A glass panel for a cathode ray tube including a substantially rectangular face portion and a skirt portion. Further constituting a side wall of the face portion, a compressive stress layer having a thickness of at least 1/10 of the thickness of the face portion, is formed on each of the inner and outer surfaces of a useful screen area of the face portion, so as to satisfy $0.4 \leq \sigma_{di}/\sigma_{ci} \leq 1.0$, where $\sigma_{ci}$ is the compressive stress on the inner surface at the center of the useful screen area, and $\sigma_{di}$ is the compressive stress on the inner surface in the vicinity of ends of diagonal axial lines of the useful screen area.

13 Claims, 1 Drawing Sheet

GLASS PANEL FOR A CATHODE RAY TUBE

FIELD OF THE INVENTION

The present invention relates to a glass panel for a cathode ray tube (hereinafter referred to as a panel) used mainly for receiving signals of TV broadcasting or the like. In particular, the present invention relates to a panel strengthened by a physically tempering method.

DISCUSSION OF THE BACKGROUND

A panel is known, in which a compressive stress layer is formed on the surface of a panel to improve the strength of the surface and thereby to prevent thermal breakage during the manufacture of a cathode ray tube or to prevent breakage after the completion of a cathode ray tube. The present applicants have made various proposals relating to panels of this type (JP-A-7-21944, JP-A-7-142012, JP-A-7-142013).

In such a panel tempering process, a panel taken out from a mold, is cooled to an annealing point or lower while a large temperature difference is kept between the inside and the surface of the glass, so that a large temporary strain can be produced. However, when such cooling operation is continued in this state, the temporary strain accumulated in the panel becomes excessive, so that self-explosion may take place during the cooling process, which makes the process practically useless. Therefore, an annealing operation is conducted to relax the temporary stress to thereby ensure the practical usefulness of the process.

On the other hand, in the process of cooling the panel to an annealing point or lower to obtain a large temporary strain, a temperature distribution will be formed not only in a thickness direction but also in an in-plane direction because of the three dimensional structure of the panel such as a thickness distribution or a heat flux distribution due to air cooling. Especially at the corner portions on the inner surface of the panel face portion, the cooling rate tends to be slow as compared with the center of the face portion by a usual process due to an influence of the three dimensional structure of the panel.

In this process, the higher the cooling rate of glass, the larger the temperature gradient in the thickness direction and the higher the tempered stress. Accordingly, under such a condition, the tempered stress (the compressive stress obtainable by tempering) at the corner portions of the face naturally becomes low as compared with the center portion.

Especially when the cooling time during this process is inadequate relative to the heat capacity of the corner portions of the face, cooling of the corner portions will be inadequate relative to the center portion of the face which is sufficiently cooled to lower than the strain point. If the annealing process is carried out in a state where the temperature of the center point in the thickness of the corner portions is lower than the strain point, tempered stress of the corner portions becomes very small compared with the tempered stress of the center portion, and uniformity of tempered stress becomes worse.

Further, cooling of the corner portions on the inner surface of the face will also be slow as compared with the skirt portion. Accordingly, the tensile stress in the in-plane direction caused by the constraint of the skirt portion, will remain in addition to the above-mentioned tempered stress. This residual stress is predominantly in a mode to deform the center portion of the panel face convexly towards the inner surface side relative to the peripheral portion of the face.

Accordingly, a panel physically strengthened by a usual method tends to have a stress distribution such that the strengthening stress along the peripheral portion of the face tends to be small relative to the center portion of the face, and the strengthening stress on the inner surface of the face tends to be small relative to the outer surface of the face, due to the temperature distribution during the cooling process because of the three dimensional structure. With a panel having such a stress distribution, if the degree of the distribution is large, the effect for preventing the thermal breakage during the manufacture of a cathode ray tube is not necessarily adequate, and there has been a limit in shortening the heat treating time. Especially, in a heating process, a tensile stress is produced on the inner surface of the face, and accordingly, it is strongly desired to improve the residual stress against a low strength region on the inner surface.

Further, when this cathode ray tube is broken by an explosion proof test, broken glass fragments tend to be finely divided, and the scattering amount tends to be large, since the panel is physically tempered. Accordingly, there has been a problem that the tempered stress can not be increased indiscriminately.

Namely, in a case where crack propagation in the panel face having the above-described stress distribution during the explosion proof test, the compressive residual stress on the inner surface is smaller than that on the outer surface, whereby the energy released as a tensile stress tends to be larger on the inner surface than on the outer surface, and even when the strengthening stress on the outer surface is equal, cracking is likely to spread on the inner surface side. It is believed that consequently, an unbalance in the progress of cracking will be created between the inner and outer surfaces, whereby fine fragments are likely to be formed, and the scattering amount tends to be large.

On the other hand, the residual stress in an in-plane direction has a mode to deform the face convexly towards the inner surface side, and when this stress is released, a motion in an outward direction will be induced, which also makes the explosion proof instable. Especially with a panel which is almost flat with a small curvature of the panel face, if it is attempted to restore a deformation of the face plane towards the inner surface side created by atmospheric pressure to the initial state by reinforcement of a band, the restoration quantity of such a face plane can not be adequately taken, and the above residual stress formed in a direction opposite to the restoration direction will be a factor which makes the explosion proof instable.

SUMMARY OF THE INVENTION

The present invention is intended to solve the above-mentioned problems which a panel having such a tempered stress distribution has.

Namely, on the basis of a discovery that the stress distribution formed on the face portion due to the temperature distribution in the cooling process because of the three dimensional structure of the panel, is substantially influential over the safety and strength of the panel, it is an object of the present invention to improve the stress distribution where the compressive stress along the periphery is small relative to the center portion on the inner surface of the face and thereby to increase the effects for preventing the thermal breakage during the manufacture of a cathode ray tube and to eliminate the instability in the explosion proof characteristic. Further, another object of the present invention is to improve such a stress distribution to provide a panel which is capable of adequately functioning even with a high compressive stress which used to be usually unacceptable and to provide a panel which can be made to have a thin thickness.

The present invention provides a panel for a cathode ray tube comprising a substantially rectangular face portion and a skirt portion constituting a side wall of the face portion, wherein a compressive stress layer having a thickness of at least $\frac{1}{10}$ of the thickness of the face portion, is formed on each of the inner and outer surfaces of a useful screen area of the face portion, so as to satisfy $0.4 \leq \sigma_{di}/\sigma_{ci} \leq 1.0$, where $\sigma_{ci}$ is the compressive stress on the inner surface at the center of the useful screen area, and $\sigma_{di}$ is the compressive stress on the inner surface in the vicinity of ends of diagonal axial lines of the useful screen area.

Further, the present invention provides a panel for a cathode ray tube comprising a substantially rectangular face portion and a skirt portion constituting a side wall of the face portion, wherein a compressive stress layer having a thickness of at least $\frac{1}{10}$ of the thickness of the face portion, is formed on each of the inner and outer surfaces of a useful screen area of the face portion, so as to satisfy $0.4 \leq \sigma_{di}/\sigma_{do} \leq 1.4$, where $\sigma_{di}$ is the compressive stress on the inner surface in the vicinity of ends of diagonal axial lines of the useful screen area, and $\sigma_{do}$ is the compressive stress on the outer surface in the vicinity of ends of diagonal axial lines of the useful screen area.

Furthermore, the present invention provides the above panel for a cathode ray tube, wherein the above compressive stress $\sigma_{di}$ within a range of $5.0 \leq |\sigma_{di}| \leq 25.0$ (MPa).

Still further, the present invention provides the above panel for a cathode ray tube, which satisfies $0 \leq z \leq r^2/(1 \times 10^4)$, wherein r is the distance (mm) on a diagonal axial line of the outer surface of the useful screen area from the center axis of the face portion to an end point of the useful screen area, and z is the distance (mm) from the end point to the tangential plane at the center of the useful screen area.

Now, the present invention will be described in detail with reference to the preferred embodiments.

DESCRIPTION OF THE PREFERRED EMBODIMENTS

The panel of the present invention comprises a substantially rectangular face portion and a skirt portion constituting its side wall, wherein a useful screen area of this face portion constitutes an image area of the cathode ray tube. On each of the inner and outer surfaces of this useful screen area, a compressive stress layer having a thickness of at least $\frac{1}{10}$ of the thickness of the face portion, is formed. Namely, the panel of the present invention has a predetermined compressive stress imparted to at least the face portion by physical strengthening, as is different from a usual panel having such a compressive stress substantially removed.

If the thickness of this compressive stress layer is smaller than $\frac{1}{10}$ of the thickness of the face portion, the strength tends to be low, and it becomes difficult to improve the safety of the cathode ray tube or to reduce the thickness of the panel. Further, if the thickness of this stress layer is small, the reduction in strength will be substantial when the surface of the face portion is damaged.

In the present invention, the strengthening degree is relatively increased at a region on the inner surface of the face where the compressive stress is small, so that the compressive stress of such a portion becomes large, thereby to improve the stress distribution. As mentioned above, on the inner surface of the face, the compressive stress is the largest at the center portion and gradually decreases towards the peripheral portion of the face, due to the temperature distribution during the cooling process because of the three dimensional structure of the panel. Accordingly, from the viewpoint of the stress distribution, the peripheral portion close to the skirt portion is a region where the stress is small. Especially in the vicinity of ends of diagonal axial lines on the inner surface of the face, i.e., at corner portions on the inner surface of the substantially rectangular face, which are relatively close to the skirt portion, the compressive stress is smaller than at other portions on the inner surface of the face.

In the present invention, the ratio of the compressive stress $\sigma_{di}$ in the vicinity of such ends of the diagonal axial lines on the inner surface of the face to the compressive stress $\sigma_{ci}$ at the center portion on the inner surface of the face is set to be within a range of $0.4 \leq \sigma_{di}/\sigma_{ci} \leq 1.0$, preferably $0.5 \leq \sigma_{di}/\sigma_{ci} \leq 0.8$.

Further, the relation between the above $\sigma_{di}$ and $\sigma_{do}$ is set to be within a range of $0.4 \leq \sigma_{di}/\sigma_{di} \leq 1.4$, preferably $0.5 \leq \sigma_{di}/\sigma_{do} \leq 1.0$, where $\sigma_{do}$ is the compressive stress on the outer surface in the vicinity of ends of diagonal axial lines of the face portion.

Figure 1:
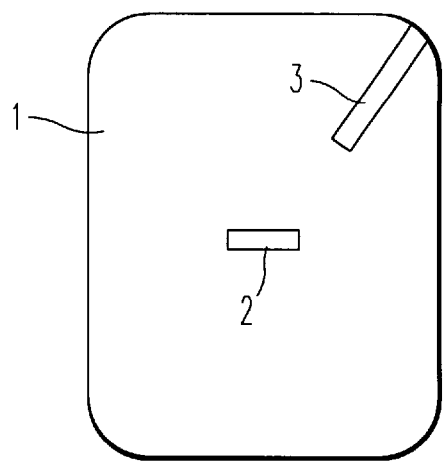
FIG. 1 is a plane view illustrating a manner of cutting out test specimens for measuring the stress of the panel.

Here, $\sigma_{ci}$, $\sigma_{di}$ and $\sigma_{do}$ are determined by the method shown in FIG. 1. A test specimen 2 (e.g. 15 mm×30 mm) is cut out from the face center portion of a panel 1, and a test specimen 3 (e.g. 15 mm×100 mm) is cut out from a corner portion on a diagonal axial line. The compressive stress on the surface of each of such test specimens is measured by means of a photoelastic stress meter by JIS-S2305 direct method (Senarmont method).

As mentioned above, the face center portion is a region where the compressive stress is maximum, and the above corner portion is a region where the compressive stress is minimum. Accordingly, the test specimens 2 and 3 represent such maximum and minimum regions of the compressive stress, respectively. And, $\sigma_{ci}$ is the maximum stress of this test specimen 2, and $\sigma_{di}$ and $\sigma_{do}$ are the minimum stress of the test specimen 3.

Figure 2:
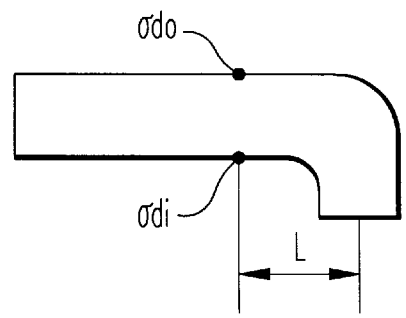
FIG. 2 is a side elevation of a test specimen cut out from the corner portion of FIG. 1.

Practically, $\sigma_{ci}$ is the stress at substantially the center portion of the test specimen 2 (see FIG. 3), and $\sigma_{di}$ and $\sigma_{do}$ may vary to some extent depending upon the shape and size of the panel, etc., but, in many cases, are determined as stress values at a position located at a distance of L (usually about 20 mm) inward from the skirt portion of the test specimen 3 (see FIG. 2).

If the ratio of $\sigma_{di}/\sigma_{ci}$ is smaller than 0.4, such is not effective for improving the thermal breakage during the manufacture of a cathode ray tube or explosion proof characteristics. If it is larger than 1.0, intensive quenching of corner portions will be required, which tends to bring about breakage during a forming process, such being not practical. To obtain such effects sufficiently and to certainly prevent breakage, the ratio of $\sigma_{di}/\sigma_{ci}$ is preferably from 0.5 to 0.8.

On the other hand, if the ratio of $\sigma_{di}/\sigma_{do}$ is smaller than 0.4, improvement in the thermal breakage during the manufacture of a cathode ray tube or explosion proof characteristics likewise tends to be hardly obtainable, and if it exceeds 1.4, intense quenching of corner portions will be required, whereby breakage is likely to take place during a shaping process. Further, if it is larger than 1.0, such is not effective for improving pressure resistant strength, whereby it tends to be difficult to sufficiently reduce the thickness of the panel, since the stress formed by the vacuuming force of a cathode ray tube is tensile on the outer surface side. The ratio of $\sigma_{di}/\sigma_{do}$ is preferably from 0.5 to 1.0.

Further, in a preferred embodiment of the present invention, in such a stress distribution of the panel, $|\sigma_{di}|$ is set to be from 5.0 to 25.0 MPa, preferably from 6.0 to 20.0 MPa. If $|\sigma_{di}|$ is smaller than 5.0 MPa, the strengthening degree of the panel decreases entirely, whereby breakage is likely to take place during or after the manufacture of a cathode ray tube, or the desired explosion proof effect tends to be hardly obtainable. On the other hand, if it is larger than 25.0 MPa, the tensile stress distributed in the interior of the face portion tends to be large, whereby the probability of breakage starting from an internal defect tends to be high. From the experience, a preferred range of $|\sigma_{di}|$ is from 6.0 to 20.0 MPa.

The present invention is particularly effective to a panel wherein the face portion is flat and for which the strength of the face portion is especially required, among physically strengthened panels. The reason is that a panel having a flat face portion is more likely to undergo breakage due to a stress formed by the vacuuming force of a cathode ray tube, as compared with a panel having a spherical or cylindrical face portion.

Figure 4:
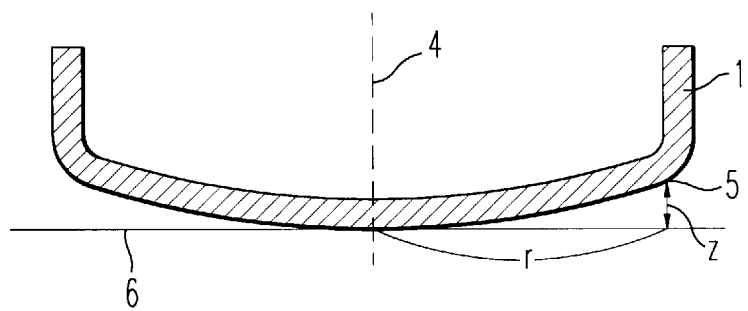
FIG. 4 is a cross-sectional view taken along the diagonal axial line of the useful screen area of the panel.

This flat panel will be described in detail with reference to FIG. 4. FIG. 4 is a cross-sectional view of a diagonal axial line portion of a useful screen area of a panel 1. This is a flat panel wherein the face portion has a large radius of curvature, so that it satisfies $0 \leq z \leq r^2/(1 \times 10^4)$, where r is the distance (mm) on this diagonal axial line of the outer surface of the face portion from the center axis 4 to an end point 5 of the useful screen area, and z is the distance (mm) from the end point 5 to the tangential plane 6 at the center of the useful screen area. When $0 \leq z \leq r^2/(6 \times 10^4)$, the average radius of curvature becomes at least 30,000 mm, whereby it is not only possible to reduce the thickness of the face portion due to an increase of the strength by an improvement of the stress distribution, but also possible to obtain a clearly viewable screen, and this is particularly effective.

If z<0, the face becomes concave, whereby polishing tends to be difficult, and the explosion proof characteristic tends to be poor thereby to lose practical utility. In such a case, the vertical length:the horizontal length of the panel face may be either 3:4, or 9:16.

In the present invention, the most convenient method to improve the compressive stress distribution on the inner surface of the face portion and to let the compressive stress balance between the inner and outer surfaces at corner portions where the strengthening degree is low, is such that in a process for quenching and strengthening the panel taken out from a mold, the corner portions of the inner surface of the face are partially more intensely cooled than other portions to increase the compressive stress on the inner surface of such corners. The degree is controlled so that the compressive stress on the inner surface of the corner portions will be in a predetermined stress distribution range relative to the compressive stress on the outer surface of the corner portions and at the center portion on the inner surface of the face.

It is thereby possible to eliminate or reduce the stress difference between the center portion and the corner portions on the inner surface of the face and the stress difference between the inner and outer surfaces at the corner portions, whereby the stress distribution can be improved. At the same time, it is possible to increase the strength of the corner portions which otherwise are weak points on the panel surface.

Now, the present invention will be described in further detail with reference to Examples. However, it should be understood that the present invention is by no means restricted to such specific Examples.

TABLE 1

| | A:$\sigma_{ci}$ (MPa) | B:$\sigma_{di}$ (MPa) | C:$\sigma_{do}$ (MPa) | B/A | B/C | Proportion of thermal breakage |
|---|---|---|---|---|---|---|
| Example 1 | −11.8 | −5.5 | −11.2 | 0.47 | 0.49 | 1/5 |
| Example 2 | −16.4 | −15.6 | −11.8 | 0.95 | 1.32 | 0/5 |
| Example 3 | −20.3 | −11.7 | −15.0 | 0.58 | 0.78 | 0/5 |
| Example 4 | −16.8 | −5.2 | −15.5 | 0.31 | 0.34 | 5/5 |
| Example 5 | −15.0 | −4.2 | −17.9 | 0.28 | 0.23 | 5/5 |

Figure 3:
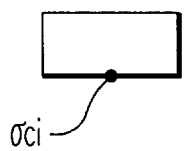
FIG. 3 is a side elevation of a test specimen cut out from the center portion of FIG. 1.

Notes:

1) These stress values are ones measured by the above-described method illustrated in FIGS. 1 to 3 with respect to the respective panels obtained by the following methods.

EXAMPLE 1

(Present Invention)

A 29 inch panel obtained by cooling the corner portions for 10 seconds with air of 1.5 m³/min in a process for quenching and strengthening a panel after it was taken out from a mold.

EXAMPLE 2

(Present Invention)

A 29 inch panel obtained by cooling the corner portions for 40 seconds with air of 1.5 m³/min in a process for quenching and strengthening a panel after it was taken out from a mold.

EXAMPLE 3

(Present Invention)

A 29 inch panel obtained by cooling the corner portions for 40 seconds with air of 0.7 m³/min in a process for quenching and strengthening a panel after it was taken out from a mold.

EXAMPLE 4

(Comparative Example)

A 29 inch panel obtained without partially cooling the corner portions in a process for quenching and strengthening a panel after it was taken out from a mold.

EXAMPLE 5

(Comparative Example)

A 32 inch panel which was obtained without partially cooling the corner portions in a process for quenching and strengthening of a panel after it was taken out from a mold.

2) Evaluation method for the proportion of thermal breakage

With a No. 150 sand paper, scratches were imparted (five revolutions) under a load of 2.2 kgf to the four corner portions on the inner surface of the panel. Then, the panel was dipped in hot water for 5 minutes and then taken out, and cool water having a temperature lower by 30° C. than the hot water, was sprinkled to the panel, whereby presence or absence of cracking was evaluated. With respect to five sample panels, the number of broken panels was counted, and the results are shown in Table 1.

From Table 1, it is evident that the panels of the Examples of the present invention, respectively, have compressive stresses $\sigma_{ci}$, $\sigma_{di}$ and $\sigma_{do}$ which are larger than the panels of the Comparative Examples, and thus they are physically strengthened. The thickness of such a compressive stress layer was measured, and it was found to be at least 1/10 of the thickness of the face.

Further, with the panels of the present invention, $\sigma_{di}$ is relatively larger than Comparative Examples relative to $\sigma_{ci}$ and $\sigma_{do}$, and each of $\sigma_{di}/\sigma_{ci}$ and $\sigma_{di}/\sigma_{do}$ is larger than 0.4, while in Comparative Examples, it is smaller than 0.4. This indicates that the panels of the present invention have improved compressive stress distributions on their face portions.

As a result, while panels of Comparative Examples all underwent breakage by the thermal breakage test, the panels of the present invention did not undergo breakage except that one panel in Example 1 underwent breakage.

As described in the foregoing, according to the present invention, it is possible to obtain a panel wherein the stress distribution on the inner surface of the face portion is improved, which is effective for thermal breakage during the manufacture of a cathode ray tube or explosion proof characteristics, and the pressure resistant strength will be improved, whereby it is possible to reduce the thickness of the panel, particularly the face portion, which contributes to enlargement of the size of the panel. Especially, practical use of a panel having a flat face portion, which used to be difficult with an improper stress distribution, can be realized.

What is claimed is:

1. A glass panel for a cathode ray tube comprising:
   a substantially rectangular face portion; and
   a skirt portion forming a side wall of the face portion,
   wherein inner and outer surfaces of a useful screen area of the face portion include a compressive stress layer having a thickness of at least 1/10 of a thickness of the face portion, and which satisfies a compressive stress ratio:

$$0.4 \leq \sigma_{di}/\sigma_{ci} \leq 1.0,$$

where $\sigma_{ci}$ is a compressive stress on the inner surface at a center of the useful screen area, and $\sigma_{di}$ is a compressive stress on the inner surface in a vicinity of ends of diagonal axial lines of the useful screen area.

2. The glass panel for a cathode ray tube according to claim 1, wherein the compressive stress $\sigma_{di}$ is within a range of $5.0 \leq |\sigma_{di}| \leq 25.0$ (MPa).

3. The glass panel for a cathode ray tube according to claim 1, wherein the face portion has a radius of curvature which satisfies the equation:

$$0 \leq z \leq r^2/(1 \times 10^4),$$

where r is a distance (mm) on a diagonal axial line of the outer surface of the face portion of the useful screen area from a center axis to an end point of the useful screen area, and z is a distance (mm) from the end point to a tangential plane at the center of the useful screen area.

4. The glass panel for a cathode ray tube according to claim 1, wherein the compressive stress ratio satisfies the equation: $0.5 \leq \sigma_{di}/\sigma_{ci} \leq 0.8$.

5. The glass panel for a cathode ray tube according to claim 2, wherein the compressive stress $\sigma_{di}$ is within a range of $6.0 \leq |\sigma_{di}| \leq 20.0$ (MPa).

6. The glass panel for a cathode ray tube according to claim 3, wherein the radius of curvature satisfies the equation: $0 \leq z \leq r^2/(6 \times 10^4)$.

7. A glass panel for a cathode ray tube comprising:
   a substantially rectangular face portion; and
   a skirt portion forming a side wall of the face portion,
   wherein inner and outer surfaces of a useful screen area of the face portion include a compressive stress layer which satisfies a compressive stress ratio:

$$0.4 \leq \sigma_{di}/\sigma_{ci} \leq 1.0,$$

where $\sigma_{ci}$ is a compressive stress on the inner surface at a center of the useful screen area, and $\sigma_{di}$ is a compressive stress on the inner surface in a vicinity of ends of diagonal axial lines of the useful screen area.

8. A glass panel for a cathode ray tube comprising:
   a substantially rectangular face portion; and
   a skirt portion forming a side wall of the face portion,
   wherein inner and outer surfaces of a useful screen area of the face portion include a compressive stress layer having a thickness of at least 1/10 of a thickness of the face portion, and which satisfies the compressive stress ratio:

$$0.4 \leq \sigma_{di}/\sigma_{do} \leq 1.4,$$

where $\sigma_{di}$ is a compressive stress on the inner surface in a vicinity of ends of diagonal axial lines of the useful screen area, and $\sigma_{do}$ is a compressive stress on the outer surface in the vicinity of ends of diagonal axial lines of the useful screen area.

9. The glass panel for a cathode ray tube according to claim 8, wherein the compressive stress $\sigma_{di}$ is within a range of $5.0 \leq |\sigma_{di}| \leq 25.0$ (MPa).

10. The glass panel for a cathode ray tube according to claim 8, wherein the face portion has a radius of curvature which satisfies the equation:

$$0 \leq z \leq r^2/(1 \times 10^4),$$

where r is a distance (mm) on a diagonal axial line of the outer surface of the face portion of the useful screen area from a center axis to an end point of the useful screen area, and z is a distance (mm) from the end point to a tangential plane at the center of the useful screen area.

11. The glass panel for a cathode ray tube according to claim 8, wherein the compressive stress ratio satisfies the equation: $0.5 \leq \sigma_{di}/\sigma_{do} \leq 1.0$.

12. The glass panel for a cathode ray tube according to claim 9, wherein the compressive stress $\sigma_{di}$ is within a range of $6.0 \leq |\sigma_{di}| \leq 20.0$ (MPa).

13. The glass panel for a cathode ray tube according to claim 10, wherein the radius of curvature satisfies the equation: $0 \leq z \leq r^2/(6 \times 10^4)$.

* * * * *